E. J. SELLA.
STEERING DEVICE.
APPLICATION FILED MAR. 25, 1919.
1,416,986.
Patented May 23, 1922.
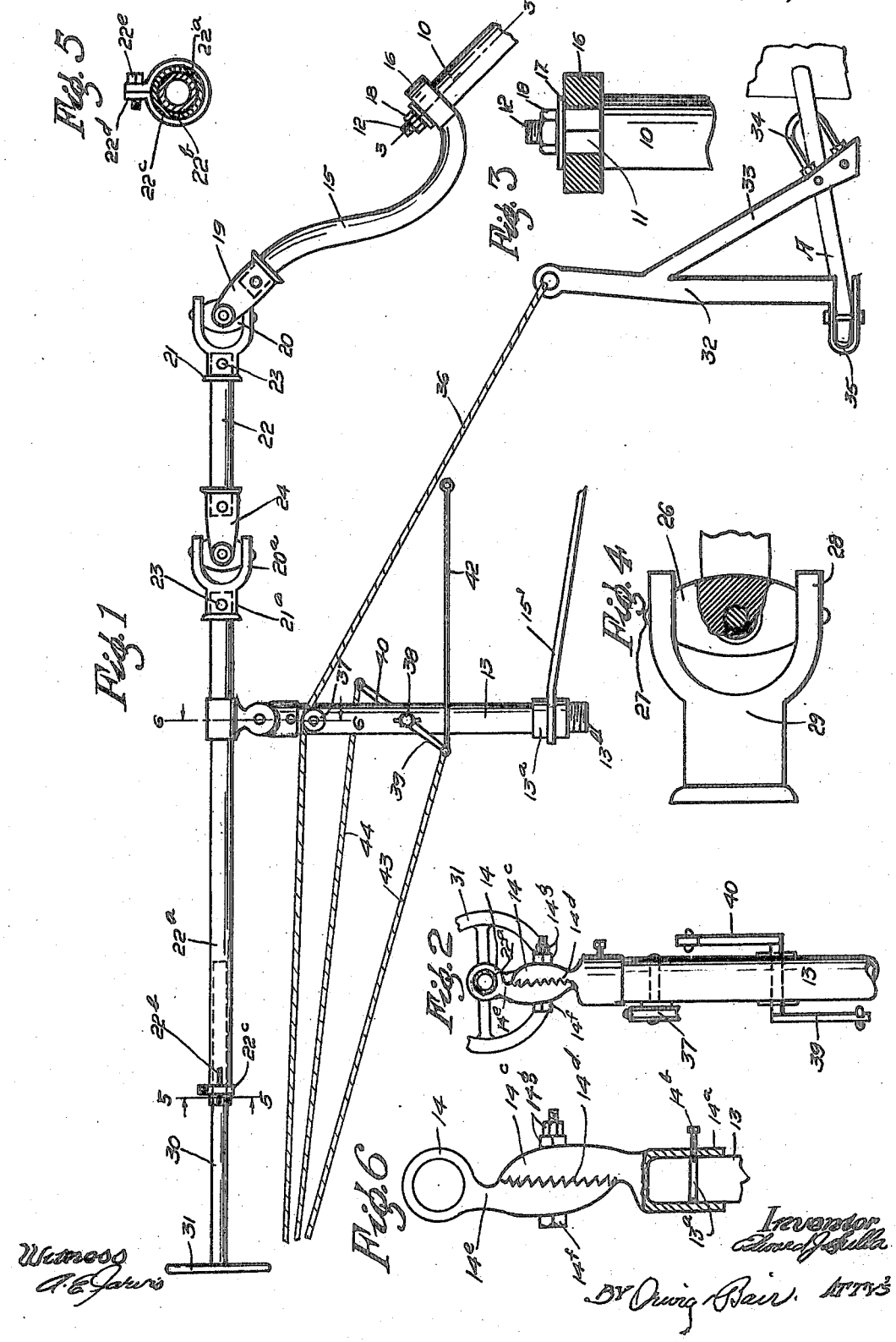

UNITED STATES PATENT OFFICE.

EDWARD JOHN SELLA, OF JEWELL, IOWA.

STEERING DEVICE.

1,416,986. Specification of Letters Patent. Patented May 23, 1922.

Application filed March 25, 1919. Serial No. 285,118.

*To all whom it may concern:*

Be it known that I, EDWARD JOHN SELLA, a citizen of the United States, and a resident of Jewell, in the county of Hamilton and State of Iowa, have invented a certain new and useful Steering Device, of which the following is a specification.

The object of my invention is to provide a steering device attachment of simple, durable and inexpensive construction adapted to be mounted on a tractor or the like for steering a tractor from a considerable distance from the rear thereof.

More particularly it is my object to provide a device designed to be connected with the steering mechanism of a tractor as an attachment, the entire device being adapted to be supported on the tractor so that it is unnecessary to mount or directly connect any parts of the attachment with the implement or vehicle or the like from which the tractor is steered or operated.

A further object is to provide such an attachment adapted to be used for controlling the clutch and throttle of a tractor from a point in the rear thereof.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of an attachment embodying my invention.

Figure 2 shows a front elevation of the supporting post or bracket forming a part of my attachment.

Figure 3 shows a sectional view taken on the line 3—3 of Figure 1.

Figure 4 shows a detail, sectional view of the joints of the steering mechanism.

Figure 5 shows a sectional view taken on the line 5—5 of Figure 1; and

Figure 6 shows a sectional view taken on the line 6—6 of Figure 1.

In the accompanying drawings, I have used the reference numeral 10 to indicate generally the steering rod of a tractor or other self-propelled device having at its upper end an angular reduced portion 11, beyond which is a screw-threaded portion 12.

My improved attachment comprises a supporting bracket comprising an upright post 13, having at its upper end a tubular bearing 14 and designed to be suitably supported on the frame of a tractor. A brace 15' may be used in connection with the post 13.

My attachment comprises means for controlling the steering post 10 from a considerable distance in the rear thereof, as, for instance, from a binder seat, or a wagon or the like.

The steering mechanism includes a member 15 having substantially the shape of a half of an S having at one end a bearing 16 mounted on the angular portion 11 of the post 10.

A washer 17 and nut 18 may be mounted on the post for holding the steering member 15 in position.

Fixed on the outer end of the member 15 is a socket 19 which is connected with a universal joint 20. The universal joint 20 has a socket 21 in which is received one end of a rod 22 which is preferably tubular, and which may be held in position by means of a set screw 23 or the like. On the opposite end of the rod 22 is another socket 24 similar to the socket 19 connected with a universal joint 20$^a$ similar to the universal joint 20.

Received in the socket 21$^a$ of the universal joint 20$^a$ and held in position by a set screw 23 similar to that already described is another rod 22$^a$ similar to the rod 22. The rod 22$^a$ extends through the bearing 14.

Telescopically received in the rear end of the tubular rod 22$^a$ and mounted for slidable adjustment therein is a steering rod 30. The rear end of the rod 22$^a$ has two preferably parallel slots 22$^b$. For locking the rod 30 in the rod 22$^a$ in any of the adjusted positions of the rod 30 I have provided a split locking band 22$^c$ of substantially resilient material. The locking band 22$^c$ has at its ends opposite flanges 22$^d$ which may be locked together by means of a screw 22$^e$.

Near the lower end of the upright post 13 is an annular portion 13$^a$ below which is a screw-threaded portion 13$^b$. The brace 15' is preferably secured to said angular portion 13$^a$ above its lower edge. The angular portion 13$^a$ is set in a suitable place in the seat, for instance, or in any substantially angular opening in the frame of the tractor, and a nut may then be screwed on the screw-threaded end 13$^b$ of the post 13 for locking it in position on the tractor.

Mounted on the upper end of the post 13 is a socket 14$^a$. In the outer surface of the upper end of the post 13 is an annular groove 13ª. Mounted in the wall of the socket 14ª is a set-screw 14ᵇ, the inner end of which projects into the groove 13ª to prevent the removal of the socket 14ª, but to permit the free rotation of the socket 14ª on the post 13. On the upper end of the socket 14ª is a plate or the like 14ᶜ having a corrugated or roughened face 14ᵈ.

On the lower part of the bearing 14 is a similar plate 14ᵉ having a similar roughened face. A bolt 14ᶠ is extended through the plates 14ᵉ and 14ᶜ and may be locked by means of nuts 14ᵍ. It will be seen that by loosening the nuts 14ᵍ the plate 14ᵉ may be rotated with relation to the plate 14ᶜ for inclining the rod 22ª to different angles with relation to the post 13, so that the steering wheel 31 may be located at a proper height for convenient operation by the driver of the machine.

In this connection it may be mentioned that there is sufficient play in the universal joints hereinbefore described to permit the tilting of the rod 22ª in the manner just described.

It will be noted that the construction and arrangement of my device are such that the rod 30 may be tilted by adjusting the plates 14ᵉ and 14ᶜ for adjusting the wheel 31 to proper position for access by a driver, and that when the adjustment has once been made for a wagon, or binder, or cultivator, or other piece of machinery or the like no further adjustment is necessary.

With this structure, therefore, it is unnecessary to provide any means for supporting the rear end of the steering device, and it is, therefore, unnecessary to connect it in any way with the implement or vehicle drawn behind the tractor, and yet the steering wheel 31 may be swung laterally for accommodating it to the movement of the tractor.

For controlling the tractor clutch I have provided a special lever device, comprising an upright member 32 and a bracket arm 33 thereon. The bracket arm 33 is designed to be connected by means of a U-bolt 34 with part of the clutch control rod A. At the lower end of the upright 32 is a yoke 35 adapted to be connected with another portion of the clutch control rod.

Secured to the upper end of the upright 32 is a rope or cable 36 which extends over a pulley 37 on the upright post 13, and thence rearwardly to position accessible to the driver on the seat of the implement or wagon or other device drawn by the tractor.

Mounted on the post 13 is a transverse shaft 38 having at its ends substantially oppositely extending arms 39 and 40.

Secured to one of said arms is a forwardly extending throttle control rod 42.

Secured to the arms 39 and 40 are cables 43 and 44 extending rearwardly and designed to be controlled by the driver.

Special attention is called to the structure of the member 15 in the shape of a half S or a goose neck and to the arrangement in which the axis of the hole in the member 16 is in line with the pivot of the member 19.

I have found this structure very important in the commercial development of my invention. In attaching a steering device to tractors of various makes, considerable difficulty is experienced.

I have found that by using the goose neck device, the hole in the member 16 can be broached to fit practically all steering posts with comparatively little difficulty. I have found that with this structure, the pivot at the upper end of the goose neck member must be in line with the hole in the member 16 in order to insure proper operation of the device.

It will be seen that my device is of very simple and inexpensive construction and that it can be readily and easily mounted on a tractor frame by means of simple tools and with very few attachments.

Some changes may be made in the construction and arrangement of the various parts of my device without departing from the essential spirit and purpose of my invention, and it is my intention to cover by my claims any modified forms of structure or use of mechanical equivalents which may be reasonably included within the scope of my claims:

I claim as my invention:

1. In a device of the class described, an upright post, a bearing supported thereon for adjustment in one plane, a steering rod in said bearing, means for connecting said steering rod with the steering post of a self-propelled vehicle, said means including a universal joint device, a shaft mounted on said post, arms on said shaft, means for moving said arms, and a throttle control rod connected with one of said arms.

2. In a device of the class described, a support, a steering device mounted on said support, a shaft mounted on said support, arms on said shaft, means for moving said arms, a throttle control rod connected with one of said arms, a lever member adapted to be connected with a clutch control rod, a flexible member connected with said lever, a guide device on said support, said flexible device being supported by said guide device.

3. In a device of the class described, means for operating a clutch control device from a distance, said means comprising a substantially upright lever having a member thereon adapted to be connected with a clutch control device and a member thereon substantially spaced from said first member, adapted to be connected with another part of the clutch control device, substantially forwardly of the first member, whereby a rearward pull on the upper end of said lever will operate said clutch control device.

4. In a device of the class described; a lever member; a connecting device on the one end of said lever adapted to readily connect said lever with a part of a clutch control device; an arm on said lever extending away therefrom at an angle thereto; and means on the free end of said arm for rigidly connecting said arm with another portion of the clutch control device.

5. In an extension steering device, extension steering device members, a goose neck device, having one end connected by a universal joint with the extension steering device members and having at its other end, a hole adapted to receive a steering post and arranged with its axis in line with the pivotal connection between the goose neck device and the universal joint structure.

Des Moines, Iowa March 15, 1919.

EDWARD JOHN SELLA.